US012784540B2

(12) United States Patent
Small et al.

(10) Patent No.: US 12,784,540 B2
(45) Date of Patent: Nov. 3, 2026

(54) WAGERING GAME ENTRY USING PORTION OF MONETARY TRANSACTION AT A CASINO DEVICE

(71) Applicant: IGT, Las Vegas, NV (US)

(72) Inventors: David Small, Moncton (CA); Bethany Plimmer, Lower Coverdale (CA); Todd Grimm, Riverview (CA); Carman Misener, Moncton (CA); Anthony Baerlocher, Henderson, NV (US); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 224 days.

(21) Appl. No.: 18/677,350

(22) Filed: May 29, 2024

(65) Prior Publication Data

US 2025/0371938 A1 Dec. 4, 2025

(51) Int. Cl.
*G07F 17/32* (2006.01)

(52) U.S. Cl.
CPC ........ *G07F 17/3244* (2013.01); *G07F 17/323* (2013.01)

(58) Field of Classification Search
CPC . G07F 17/3244; G07F 17/323; G07F 17/3255
See application file for complete search history.

(56) References Cited

U.S. PATENT DOCUMENTS 7,819,742 B2 * 10/2010 Chamberlain ........... G07G 5/00 463/16
9,087,438 B2 * 7/2015 Aponte ............... G07F 17/3211
2008/0132329 A1 * 6/2008 Jorasch ............... G07F 17/3244 463/25
2011/0151957 A1 * 6/2011 Falciglia, Sr. ...... G07F 17/3244 463/25
2012/0122556 A1 * 5/2012 Schrotter ............. G06Q 20/209 463/25
2016/0093146 A1 * 3/2016 Kitamura ............ G07F 17/3258 463/20

(Continued)

FOREIGN PATENT DOCUMENTS

CA 3081481 A1 4/2020

OTHER PUBLICATIONS

"True Time Bonusing Tool Kit," Konami Gaming, Inc., (downloaded from the internet May 28, 2024) https://www. konamigaming.com/docs/default-source/slicks/true-time-bonusing-tool-kit-slick.pdf?sfvrsn=1772a846_2, 4 pages.

(Continued)

*Primary Examiner* — James S. McClellan
(74) *Attorney, Agent, or Firm* — Spencer Fane LLP; William M. Kelly

(57) ABSTRACT

A monetary transaction at a casino device associated with a first monetary amount is determined, and a user account associated with the monetary transaction is determined. A display device displays an offer to purchase a wagering game entry for a second monetary amount less than the first monetary amount. In response to acceptance of the offer, the wagering game entry is associated with the user account. A wagering game result for the wagering game entry is determined, and, in response to the wagering game result being a winning result, a wagering game award is awarded to the user associated with the user account.

20 Claims, 10 Drawing Sheets

(56) References Cited

U.S. PATENT DOCUMENTS

| | | | | |
|---|---|---|---|---|
| 2016/0284169 | A1* | 9/2016 | Racho | G07F 17/3244 |
| 2020/0051371 | A1* | 2/2020 | Nelson | G06T 19/006 |
| 2024/0153348 | A1* | 5/2024 | Charest | G06Q 50/34 |
| 2024/0355175 | A1* | 10/2024 | Russ | G07F 17/3223 |

OTHER PUBLICATIONS

"Mariners Care Foundation 50/50 Raffle," (c) 2024 MLB Advanced Media, LP, (downloaded from the internet May 28, 2024) https://www.mlb.com/mariners/community/mariners-care-foundation/50-50-raffle, 3 pages.

* cited by examiner

400

WAGERING GAME ENTRY USING PORTION OF MONETARY TRANSACTION AT A CASINO DEVICE

BACKGROUND

Embodiments described herein relate to wagering games, and in particular to a wagering game entry using a portion of a monetary transaction at a casino device, and related devices, systems, and methods. Conventional wagering games may accept wagers directly at gaming devices, such as Electronic Gaming Machines (EGMs), to provide the wagering games to the player. However, casino and other gaming environments contain many other opportunities for monetary transactions. There is a need for additional wagering opportunities for different monetary transactions, in order to increase player engagement and enjoyment.

BRIEF SUMMARY

According to some embodiments, a system includes a processor circuit and a memory coupled to the processor circuit. The memory includes machine-readable instructions that, when executed by the processor circuit, cause the processor circuit to determine a monetary transaction at a casino device associated with a first monetary amount. The instructions further cause the processor circuit to determine a user account associated with the monetary transaction. The instructions further cause the processor circuit to display, at a display device, an offer to purchase a wagering game entry for a second monetary amount less than the first monetary amount. The instructions further cause the processor circuit to, in response to acceptance of the offer, associate the wagering game entry with the user account. The instructions further cause the processor circuit to determine a wagering game result for the wagering game entry. The instructions further cause the processor circuit to. in response to the wagering game result being a winning result, award a wagering game award to the user associated with the user account.

According to some embodiments, a casino device includes a display device, an input device, a processor circuit, and a memory coupled to the processor circuit. The memory includes machine-readable instructions that, when executed by the processor circuit, cause the processor circuit to determine a monetary transaction at the casino device associated with a first monetary amount. The instructions further cause the processor circuit to determine a user account associated with the monetary transaction. The instructions further cause the processor circuit to display, at the display device, an offer to purchase a wagering game entry for a second monetary amount less than the first monetary amount. The instructions further cause the processor circuit to, in response to acceptance of the offer, associate the wagering game entry with the user account. The instructions further cause the processor circuit to determine a wagering game result for the wagering game entry. The instructions further cause the processor circuit to, in response to the wagering game result being a winning result, award a wagering game award to a user associated with the user account.

According to some embodiments, a method includes determining, by a processor circuit, a monetary transaction at a casino device associated with a first monetary amount. The method further includes determining, by the processor circuit, a user account associated with the monetary transaction. The method further includes displaying, at a display device of the casino device, an offer to purchase a wagering game entry for a second monetary amount less than the first monetary amount. The method further includes, in response to acceptance of the offer, associating, by the processor circuit, the wagering game entry with the user account. The method further includes determining, by the processor circuit, a wagering game result for the wagering game entry. The method further includes, in response to the wagering game result being a winning result, awarding, by the processor circuit, a wagering game award to a user associated with the user account.

DETAILED DESCRIPTION

Figure 1:
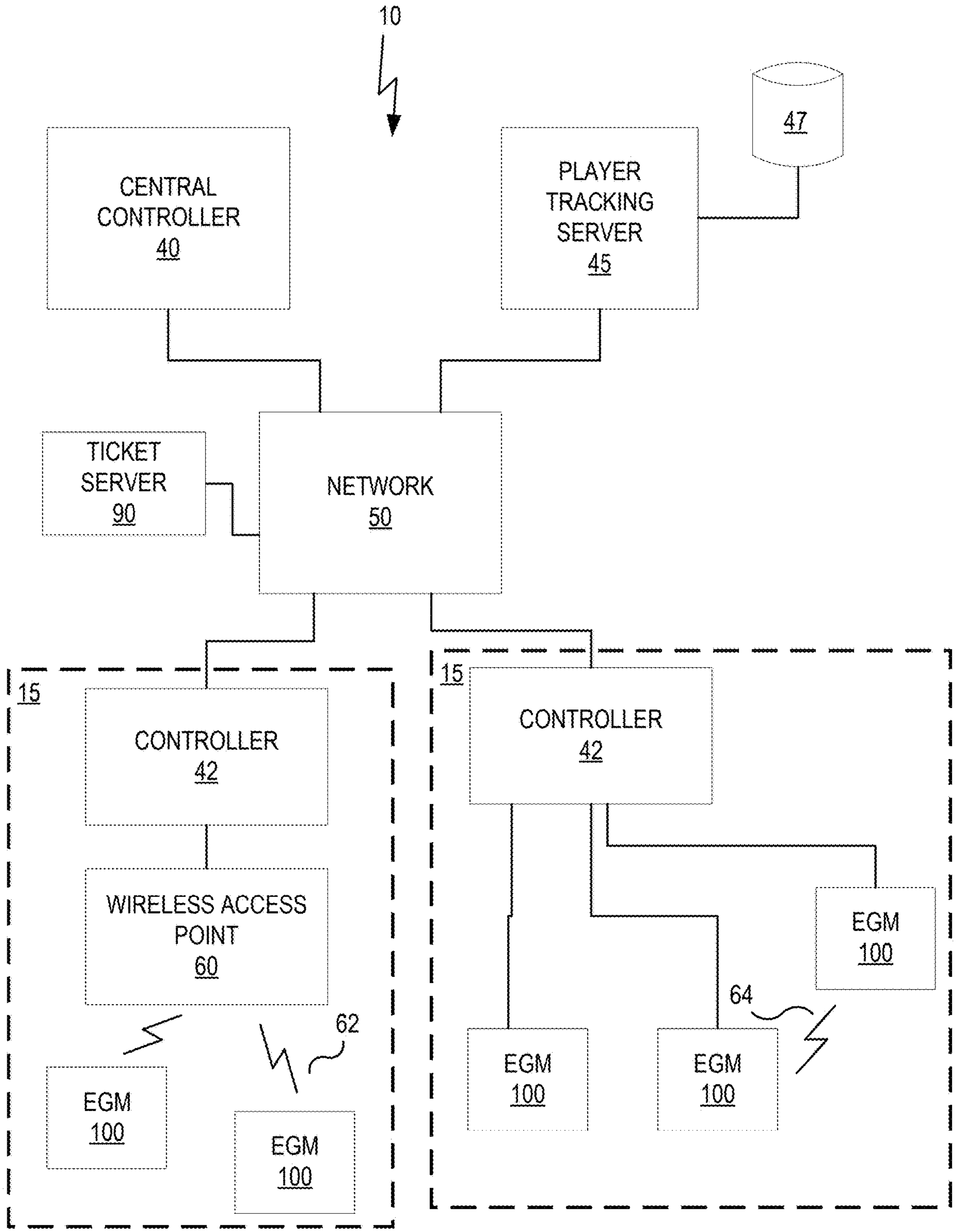
FIG. 1 is a schematic block diagram illustrating a network configuration for a plurality of gaming devices according to some embodiments.

Embodiments described herein relate to wagering games, and in particular to a wagering game entry using a portion of a monetary transaction at a casino device, and related devices, systems, and methods.

According to some embodiments, a monetary transaction at a casino device associated with a first monetary amount is determined, and a user account associated with the monetary transaction is determined. A display device displays an offer to purchase a wagering game entry for a second monetary amount less than the first monetary amount. In response to acceptance of the offer, the wagering game entry is associated with the user account. A wagering game result for the wagering game entry is determined, and, in response to the wagering game result being a winning result, a wagering game award is awarded to the user associated with the user account.

In some examples, an event may be run by a casino or lottery operator, in which players may allocate a portion of a monetary transaction toward to purchase a ticket for a wagering game, drawing, progressive, bonus game, etc. Players may set up a dedicated account and/or may use an existing player account. For a drawing-style game, players may accumulate tickets and/or entries through different channels, such as casino Electronic Gaming Machines (EGMs), Video Lottery Terminals (VLTs), online gameplay, sports betting, table games, online or retail lottery tickets, and/or other channels. The game may be run locally, e.g., within a particular venue or locality, or in a wider area.

The hold percentage for these types of games may vary, and may be substantially larger than traditional casino games and wagers, e.g., 50%. The hold may be directed to the casino, lottery, or other hosting venue, and/or may be directed to a third party, such as a charity, fundraiser, or other benefit.

In some examples, signing-up with an account may also enable winners to be selected from a larger pool of players, regardless of whether players have purchased tickets directly. In some examples, if a player is selected who has not purchased a ticket or entry, the player may be announced and/or notified as being a non-winner, and the prize may not be awarded, thereby providing incentive for eligible players to purchase tickets and/or entries for future drawings.

One advantage of this type of game is that it does rely on random number generation (RNG), and does not interact with RNG or other aspects of other games. Because the game does not impact Return to Player (RTP) percentages for the existing games, the game may not be bound by the same regulatory rules or restrictions as other games, and may be more easily introduced into different jurisdictions. For example, to implement that game at an EGM, the game can be run entirely separately from the EGM and can be presented remotely, e.g., via a service window or other interface that does not interact with or interfere with the regular operation of the EGM.

These and other features can be implemented through hardware such as a purchase/draw engine, which may be set up to collect entries and automatically draw based on different criteria, such as a pre-scheduled timetable and/or when the pot reaches a certain amount. Entries may be purchased through machine interfaces, such as at an EGM or VLT, or via computing devices, such as a mobile computing device app for purchasing entries and receiving notifications of jackpot size and winners. A data concentrator may aggregate wagers from each channel locally and/or over a wide area, from different vendor devices or systems, with entries being transferred to the draw engine so that when a name is drawn, the system may verify whether the player had purchased a ticket for that draw, and whether the player is a winner or non-winner. An enrollment/wager module may be overlaid within each game across different channels to allow players to participate while playing other games. For example, in a lottery implementation, an additional cost may be added for online and/or retail ticket purchases. A notification system may notify winners and other players of game events, and a gaming server system may provide a notification via a machine interface when playing another game. Notifications may also be provided via mobile app notifications, social media, user check-ins through a dedicated app, website, device, and/or venue, media displays on gaming devices and/or banks of gaming devices, walls, overhead signage, button panels on a gaming machine, etc.

These and other embodiments provide new and additional revenue opportunities and new gameplay features for players without negatively impacting existing games. The risk that an enrolled player may be a non-winner if an entry is not purchased encourages ongoing participation, and increases loyalty to certain games, operators and/or venues. Winners may be announced on a pre-determined schedule through various channels, and players may be drawn to regularly check in, which may increase player engagement and loyalty.

In some examples, a player may sign up to create an account and/or enable a game entry feature on an existing player account, digital wallet account, etc., e.g., via a mobile app or gaming device. Entries may be purchases via gaming devices, such as an EGM or sports betting terminal, e.g., via an overlay on the EGM or via an option to add on to a base wager (with the base wager going toward directly to the game and the add on amount going toward the entry), thereby leaving the underlying game unaffected. Other entry options may include applying a portion of a game win toward an entry, prompting the player at cash out and/or upon leaving a game to purchase an entry, applying residual funds (i.e., below a minimum bet amount for a game) toward an entry, via a mobile app, online gaming, lottery, etc.

Drawing frequency may be scheduled and arranged according to different criteria, such as a larger jackpot that hits less frequently, e.g., once a month or once a week, or smaller jackpots that hit more frequently, e.g., daily or hourly. In some examples, a player may choose to participate in specific draws having different frequencies.

The ticket aggregator may provide the draw engine with a pool of players that have purchased tickets for that particular draw, and how many tickets they have purchased. The pool of registered players may be adjusted so that players who purchased multiple tickets for that draw may have a greater chance of being selected. The engine may draw a name and then verify if the winning player actually purchased a ticket for that particular draw. If the person drawn did not purchase a ticket for that draw, they would be announced as a non-winner and the draw amount would accumulate until the next draw.

A winner notification system may inform players and non-players of the draw outcomes, thereby providing an additional promotion, brand marketing and brand loyalty mechanism to prompt players to remain engaged with the system. Notification mechanisms may include a gaming server system for notification via an active gaming session for another game, app notifications, social media, date and time check-ins, media displays, etc. In some embodiments, a winning player may be prompted to cash out or bank the award for future play (e.g., slot credits, lottery tickets, etc.).

According to some embodiments, entries may be collected in one location, such as in a casino, with a jackpot awarded in a predetermined time period, e.g., 20 minutes, and with the jackpot increasing with the number of entries. In some examples, a ticket or entry may be funded with a relatively small amounts, e.g., $0.01, collected quickly, e.g. with each spin for a slot-style wagering game at an EGM for example.

In some examples, a maximum wager for a game may be adjusted such that the wager can be rounded up to include an entry. For example, a game may be adjusted to have a $3.75 maximum wager, and an option to wager $4.00 to also receive an entry, with the additional $0.25 funding jackpot. In some examples, a game interface may include a "Max Bet" button and a separate "Max-Bet+" button. These and other features may be enabled at the game level, e.g., within the game presentation or interface itself, or through a system level, e.g., separately from the game presentation or interface, which may allow for a game to be offered across different games, operators, vendors, etc.

In some examples, entries may be tied to other transactions, such as food or drink, merchandise, and/or services, etc. purchased on the casino property. In some examples, entries could be purchased at cashout, such as by presenting an option to apply some of the cashout funds towards an entry. In some examples, certain games may include the additional funding for the bonus game automatically, e.g., as a marketing or promotional tool. For example, the wager may be shown graphically being split between the main game wager and the entry. The total amount allocated to entries during a game session may also be shown graphically.

Jackpots may be tied to specific properties and/or locations within a property, such as a portion of the casino floor, a bank of machines or a specific machine. In some examples, payouts may be guaranteed to occur in a certain location at a certain time, thereby encouraging play in that area or bank of machines if the jackpot has not yet been hit. Entries may also be awarded as promotions or as bonus awards, may be purchased using award points or other non-monetary means, and/or via casino devices, such as EGMs, kiosks, cashiers, etc.

Before describing these and other features in greater detail, reference is now made to FIG. 1, which illustrates a gaming system 10 including a plurality of gaming devices 100 (which are EGMs in this embodiment). The gaming devices 100 may be one type of a variety of different types of gaming devices, such as electronic gaming machines (EGMs), video lottery terminals (VLTs), mobile gaming devices, or other devices, for example. The gaming system 10 may be located, for example, on the premises of a gaming establishment, such as a casino, and/or distributed across one or more different locations 15, such as a plurality of retailers or other establishments. The gaming devices 100 may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. Each location 15 may include a site controller 42 for managing communication with the central controller 40 and for controlling and managing the gaming devices 100. The central controller 40 and/or site controller 42 may be any suitable server or computing device which includes at least one processing circuit and at least one memory or storage device. Each gaming device 100 (which are EGMs in this example) may include a processing circuit that transmits and receives events, messages, commands or any other suitable data or signal between the gaming device 100, the site controller 42, and/or the central controller 40. The gaming device processing circuit is operable to execute such communicated events, messages or commands in conjunction with the operation of the gaming device 100. Moreover, the processing circuit of the and/or site controller 42 is configured to transmit and receive events, messages, commands or any other suitable data or signal between the central controller 40, the site controller 42, and/or each of the individual gaming devices 100. In some embodiments, one or more of the functions of the central controller 40 and/or site controller 42 may be performed by one or more gaming device processing circuits. Moreover, in some embodiments, one or more of the functions of one or more gaming device processing circuits as disclosed herein may be performed by the central controller 40 and/or site controller 42.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 and/or site controller 42 through the data communication network 50. The ticket server 90 may be located remotely from the individual locations 15 and/or site controllers 42 and/or may be located at individual locations 15 and/or proximate to individual site controllers 42. In some examples, the ticket server 90 and/or functions thereof may be integrated into the central controller 40 and/or local controllers 42. Each ticket server 90 may include a processing circuit that transmits and receives events, messages, commands or any other suitable data or signal between the ticket server 90 and the central controller 40 and/or local controller 42. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40 and/or local controller 42.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. Some embodiments provide that gaming devices 100 may communicate with other gaming devices 100 or other system components over a wireless interface 64. In these embodiments, wireless interface 62, and wireless interface 64 may use different communication protocols and/or different communication resources, such as different frequencies, time slots, spreading codes, etc.

Figure 2A:
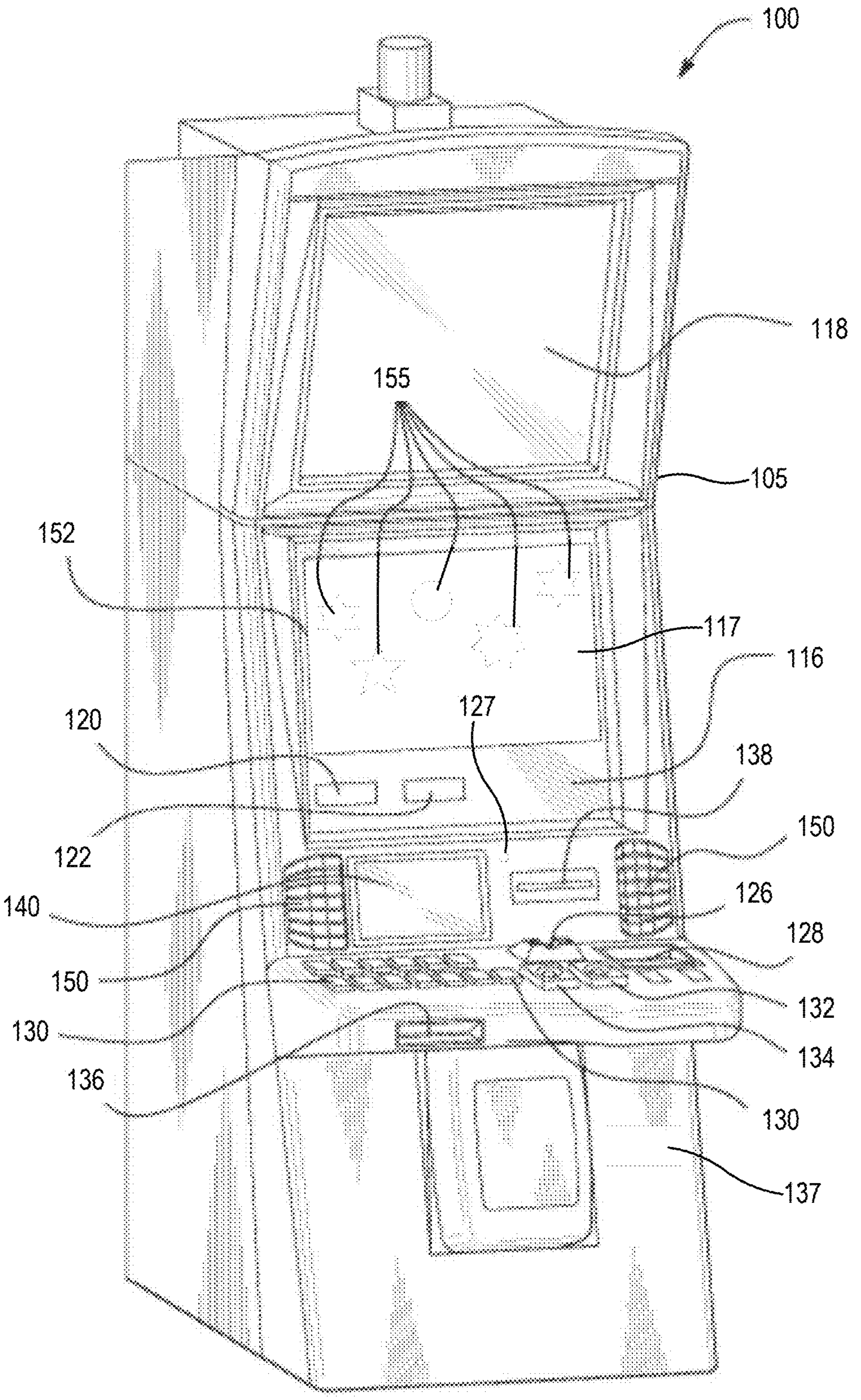
FIG. 2A is a perspective view of a gaming device that can be configured according to some embodiments.
Figure 2B:
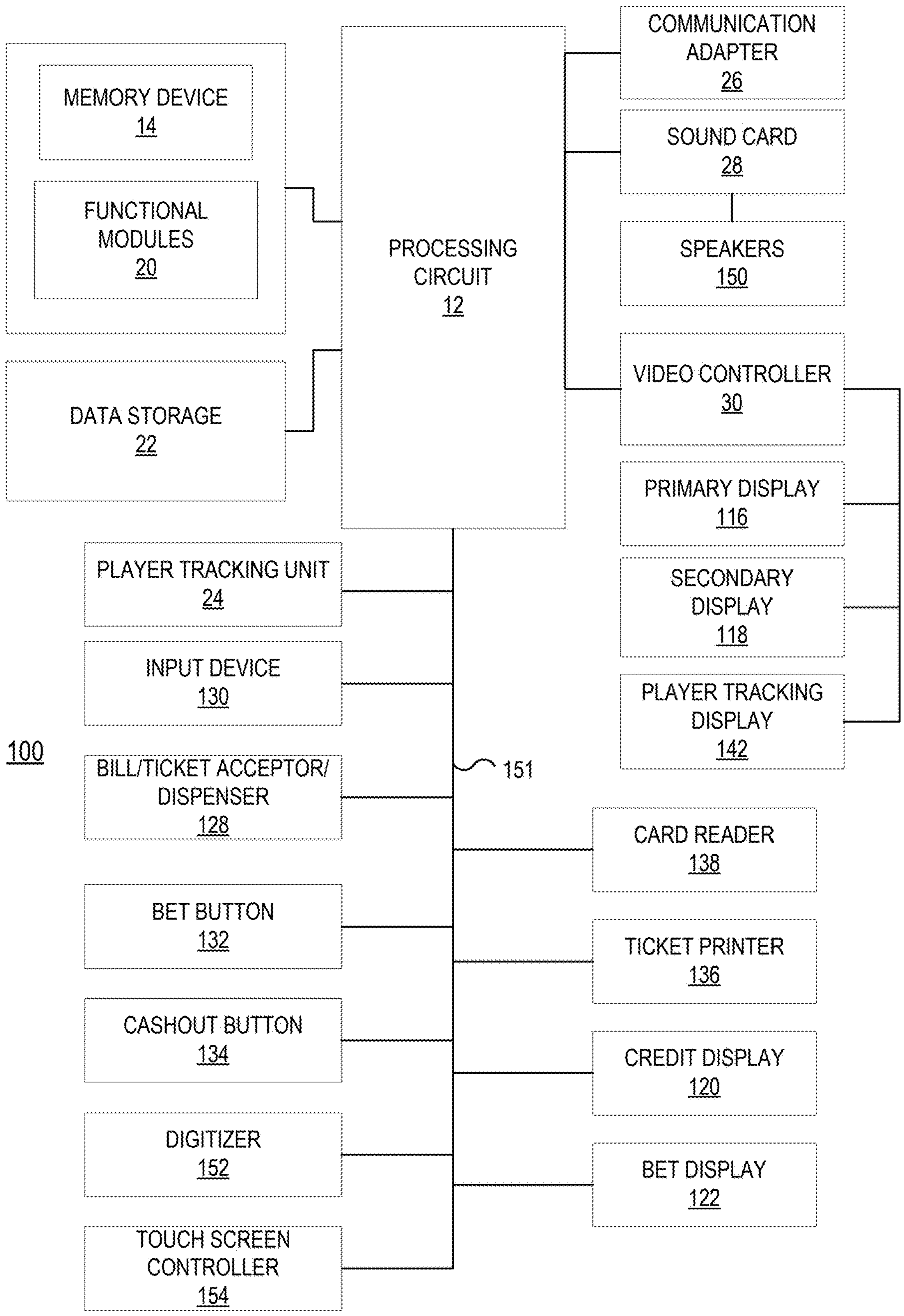
FIG. 2B is a schematic block diagram illustrating an electronic configuration for a gaming device according to some embodiments.
Figure 2C:
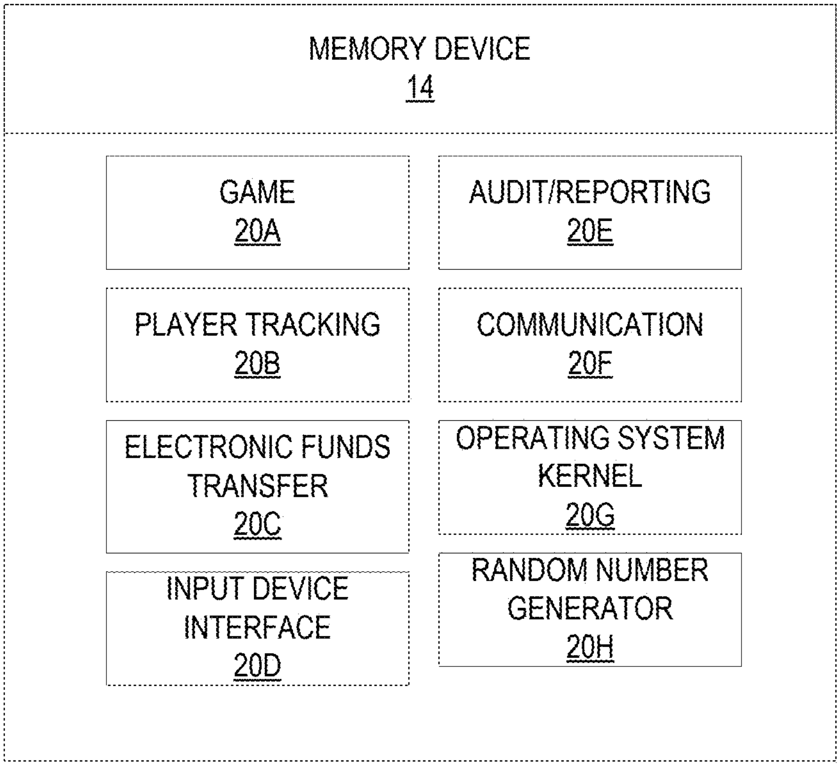
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
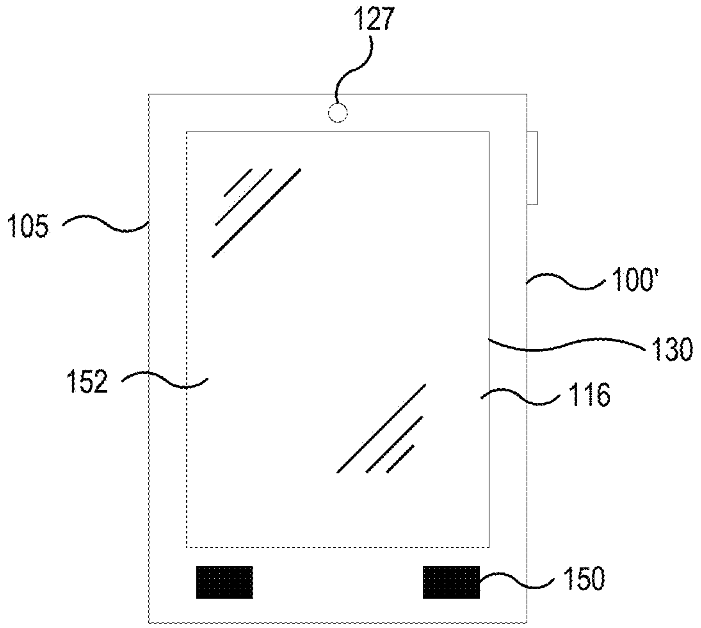
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
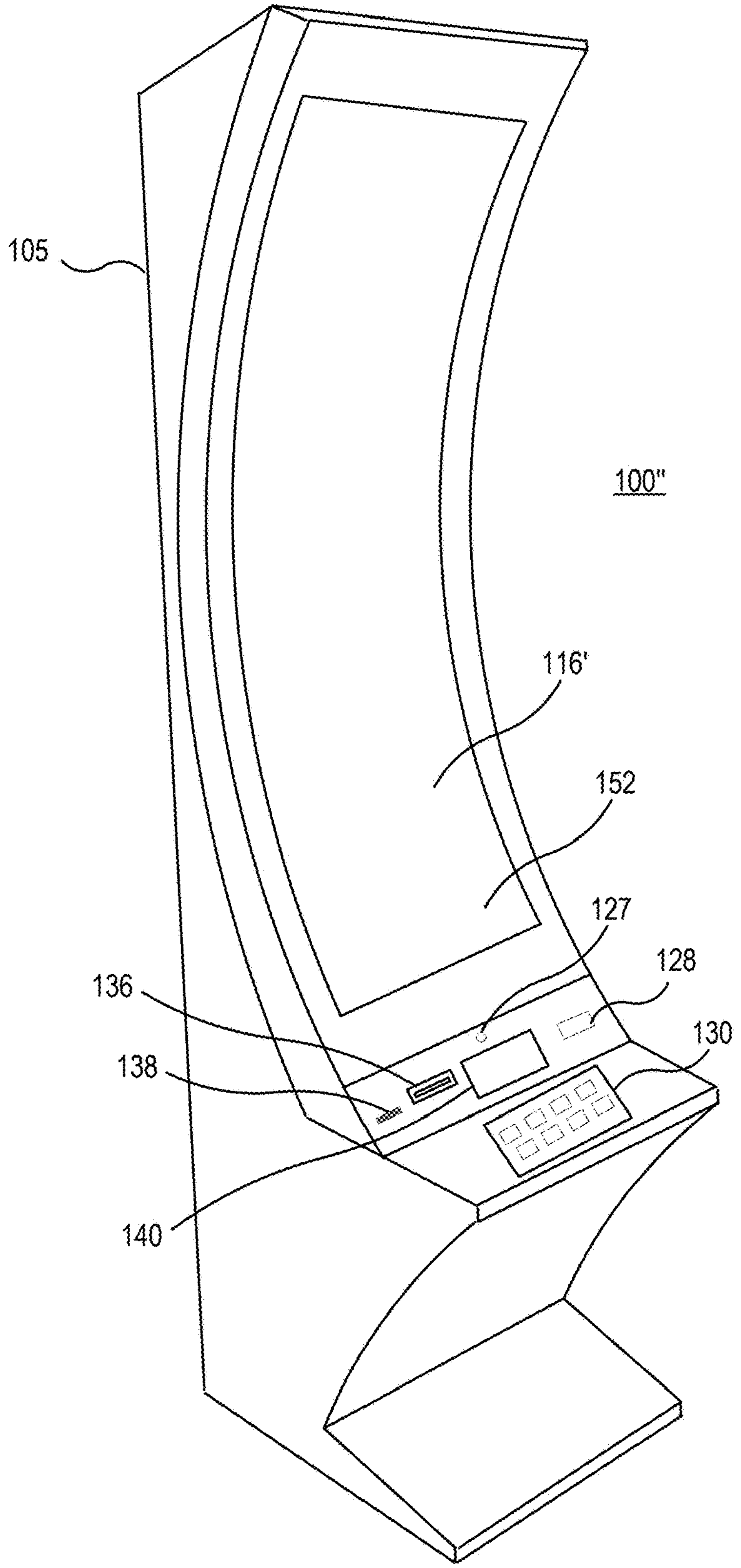
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as EGMs, VLTs, and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino, lottery, or other style games. Further, gaming devices according to embodiments herein may be implemented using other computing devices and mobile devices, such as smart phones, tablets, and/or personal computers, among others.

Figure 3A:
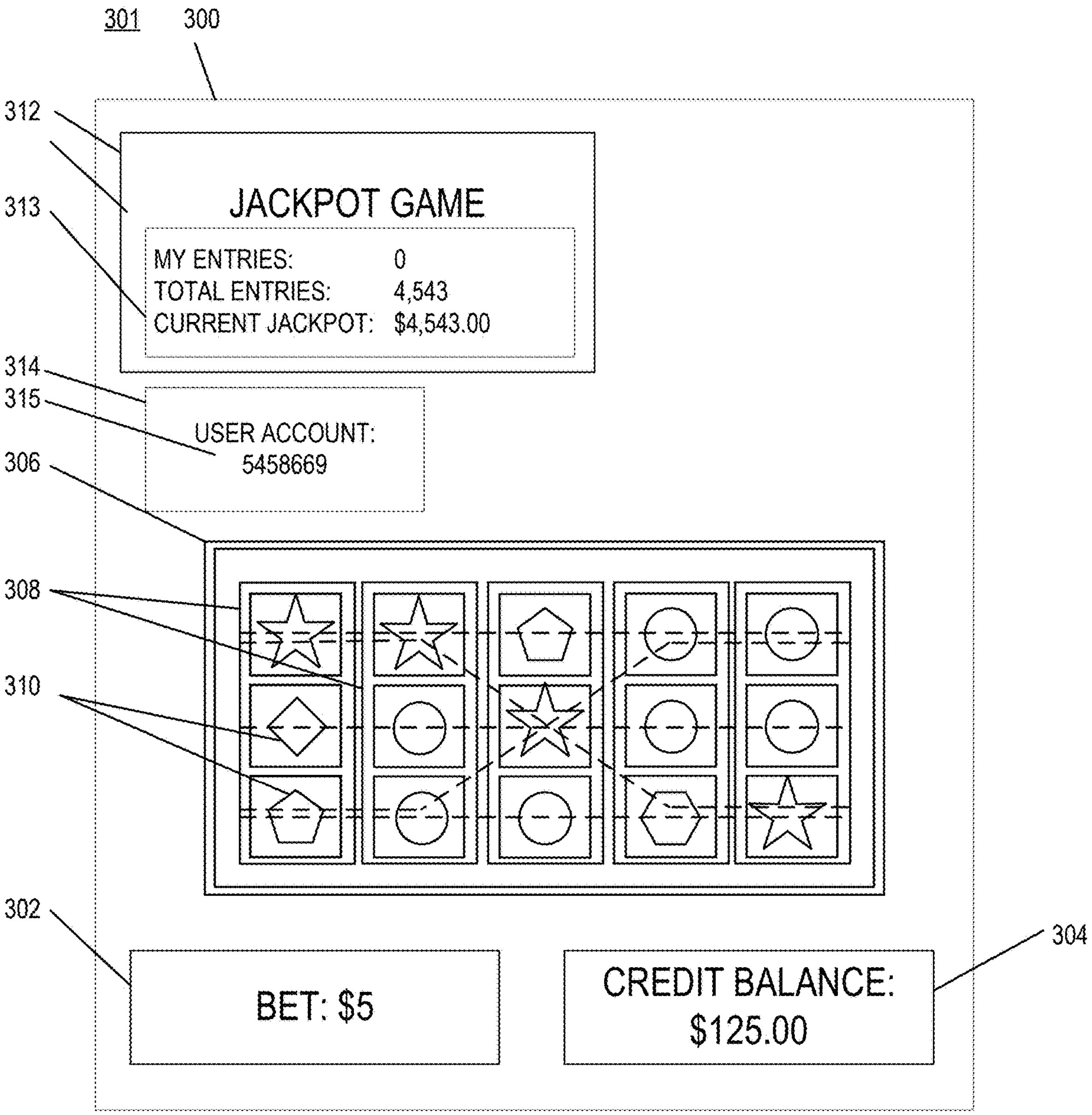
FIGS. 3A-3D illustrate a graphical user interface (GUI) for a providing a wagering game entry using a portion of a monetary transaction at an EGM, according to some embodiments

FIGS. 3A-3D illustrate a graphical user interface (GUI) 300 for a wagering game at an EGM 301, according to some embodiments. As shown by FIG. 3A, the GUI 300 may include a bet button 302, a credit meter 304 for a base wagering game, and a plurality of game elements 306 for the base wagering game, such as a plurality of slot reels 308 and slot symbols 310 for example. In this example, the GUI 300 further includes a jackpot game display 312 indicating a currently active jackpot game with a plurality of wagering game entries and a jackpot game award 313, and a user account display 314 indicative of a user account 315 associated with a player of the base wagering game.

Figure 3B:
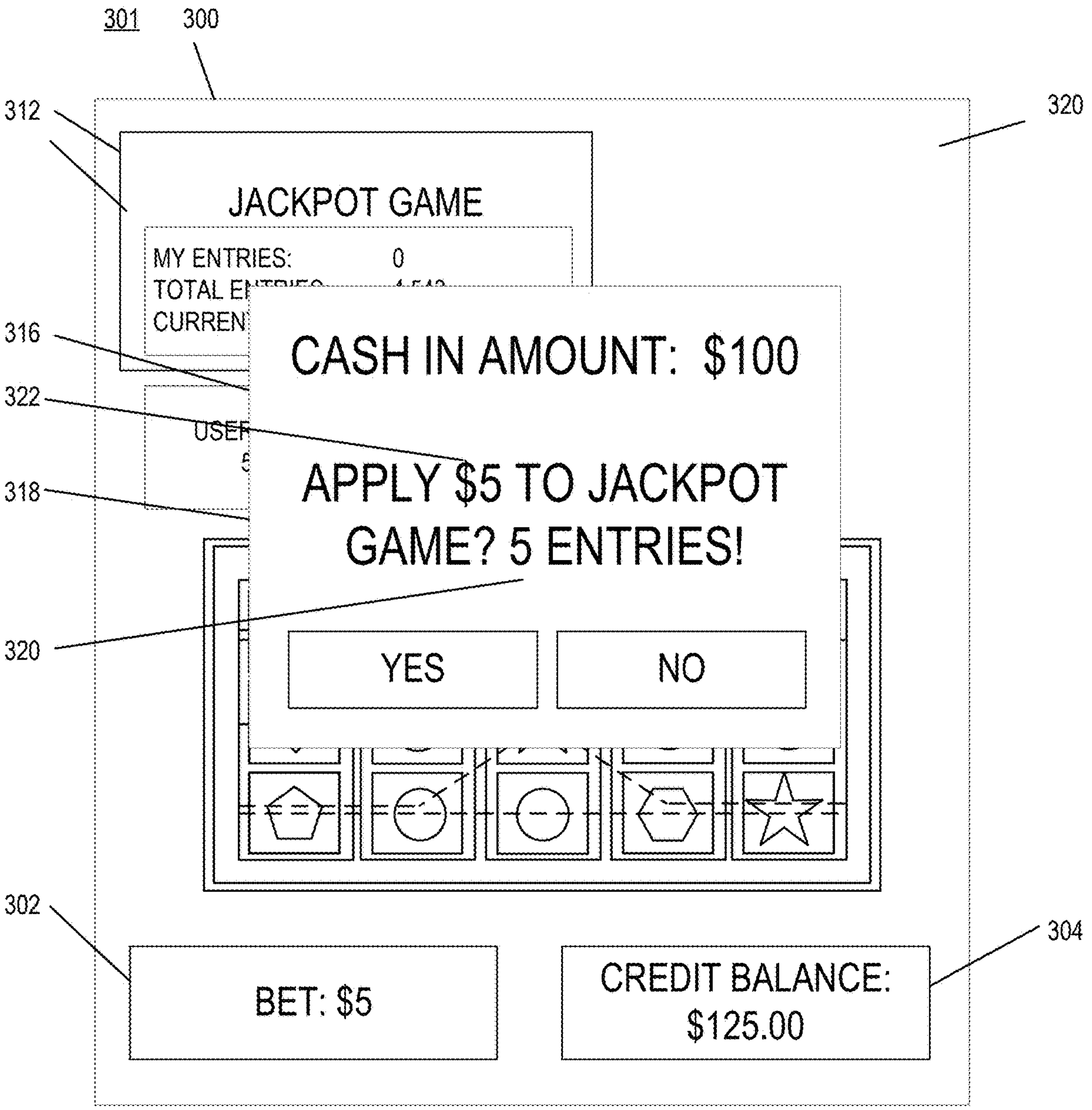

Based on a monetary transaction at the EGM 301 for a first monetary amount 316 associated with the user account, such as a cash in transaction as shown in FIG. 3B, the GUI 300 display an offer 318 to purchase a wagering game entry 320 (for the jackpot game in this example) for a second monetary amount 322 less than the first monetary amount 316. In some embodiments, the monetary transaction may include a base wagering game wager, a base wagering game award, a cash-out transaction, a purchase amount for a purchase at a point-of-sale device, or other transaction, as desired. In this example, the wagering game entry 320 is a game ticket for a wagering game drawing.

Figure 3C:
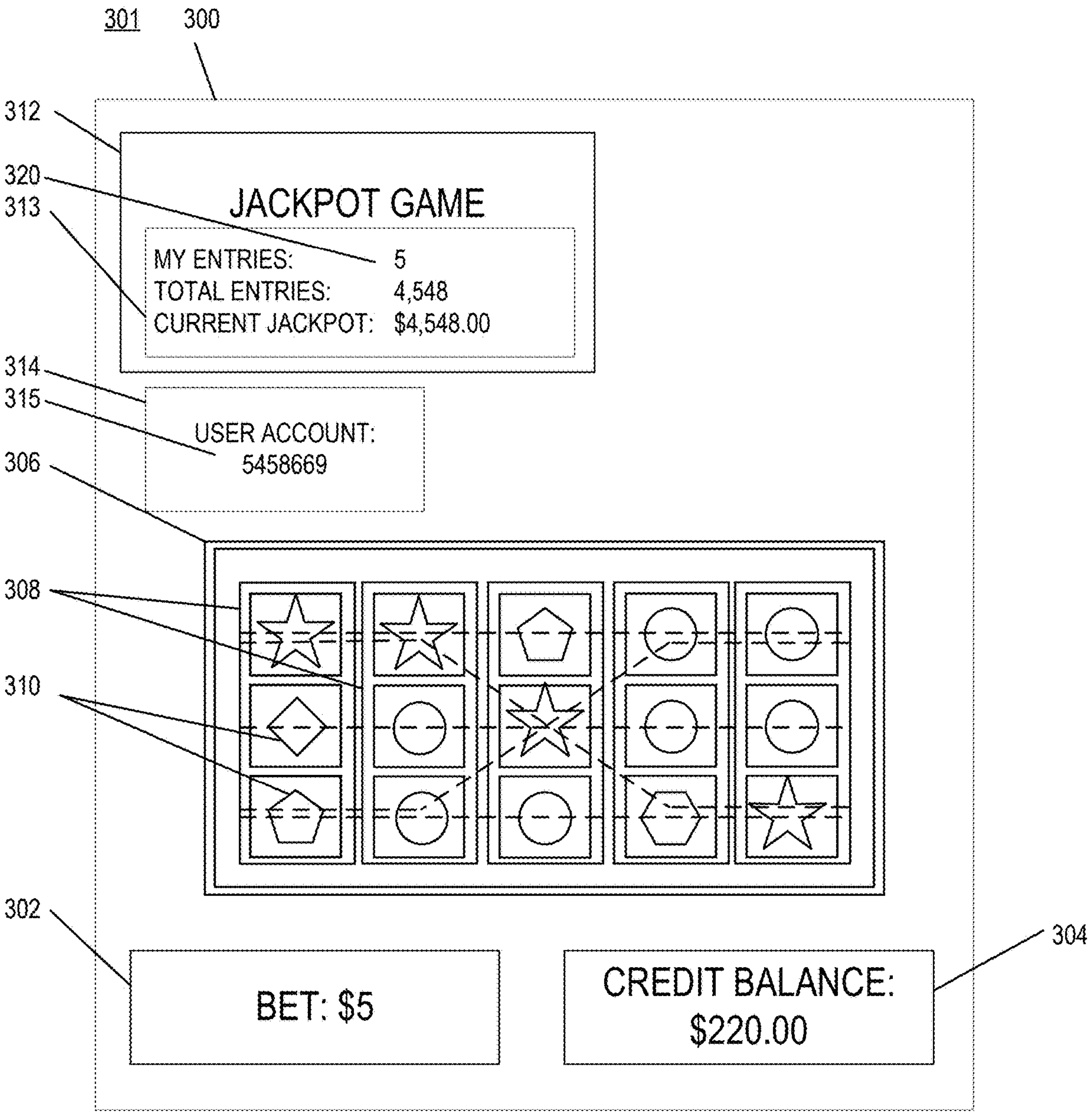

As shown in FIG. 3C, in response to acceptance of the offer, the wagering game entry 320 is associated with the user account 315. In this example, the second monetary amount 322 is deducted from the first monetary amount 316, i.e., the cash-in transaction is reduced by the amount of the wagering game entry 320.

Figure 3D:
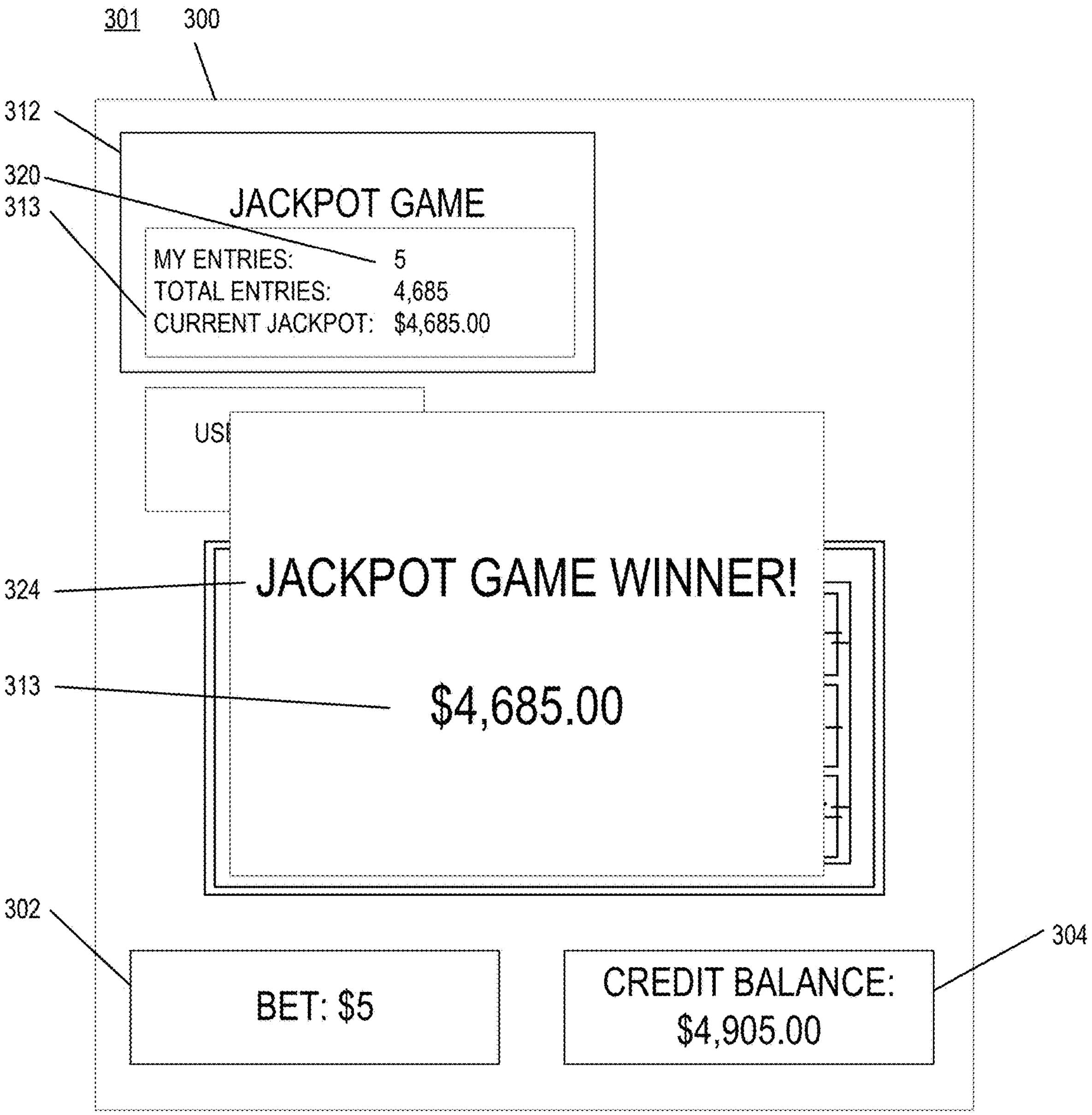

As shown in FIG. 3D, a wagering game result is determined for the wagering game entries for the jackpot game. In this example, the determination of the wagering game result for the wagering game entries may occur on a predetermined schedule, e.g., hourly, daily, weekly, etc., and/or at a randomly selected time. In this example, the wagering game result for the wagering game entry 320 is a winning result, and the jackpot game award 313 is awarded to the user associated with the user account 315. The GUI 300 may also notify the winning user and/or other users associated with game entries of the winning result. In this example, the notification 324 is displayed by the EGM 301, but it should be understood that other types of notifications may be used, such as via transmission of a notification message to a mobile computing device associated with the user for display by the mobile computing device for example.

Figure 4:
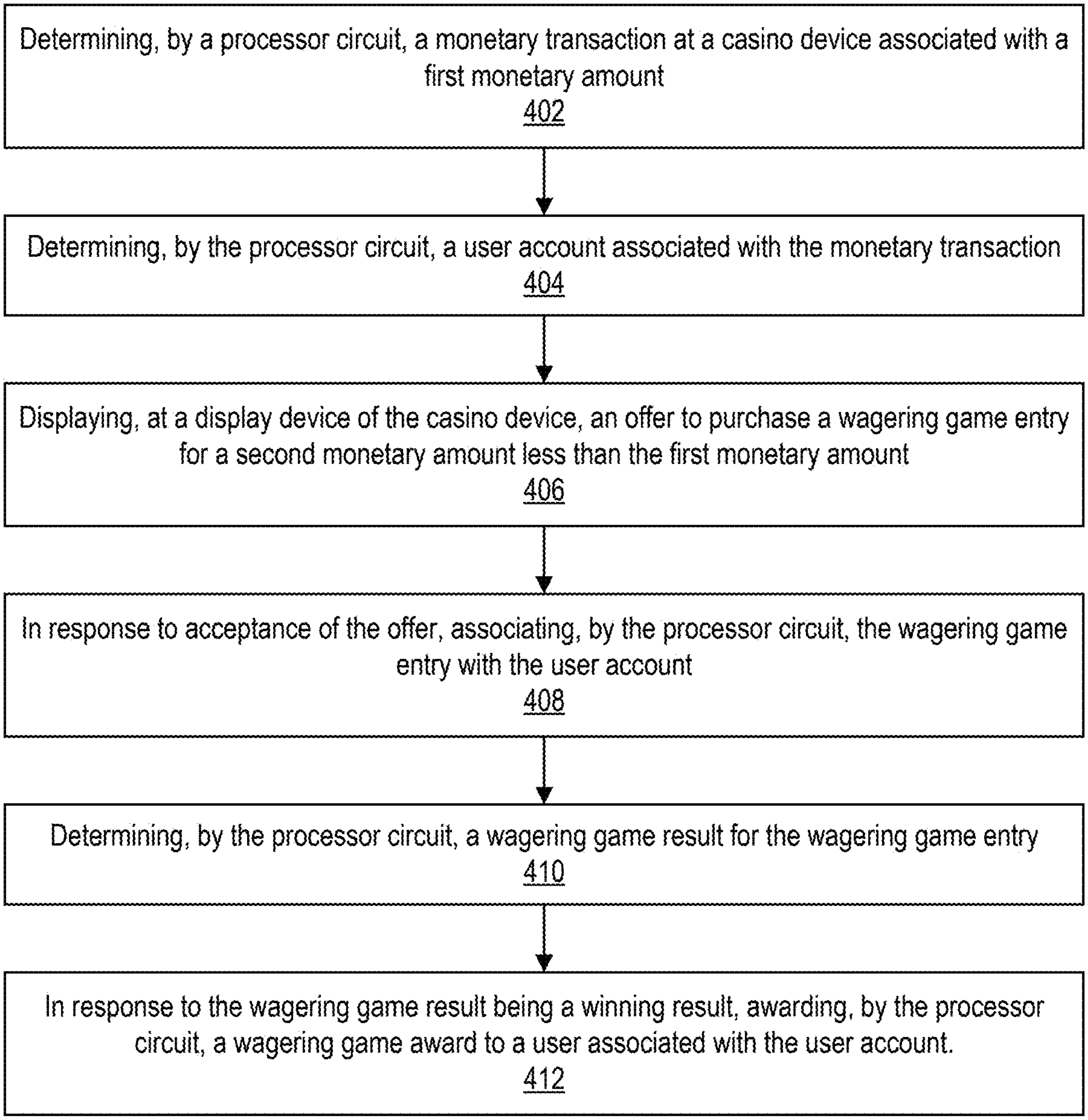
FIG. 4 is a flowchart illustrating operations of systems/methods for providing a wagering game entry using a portion of a monetary transaction at a casino device, according to some embodiments

FIG. 4 is a flowchart illustrating operations 400 of systems/methods for providing a wagering game entry using a portion of a monetary transaction at a casino device, according to some embodiments. The operations 400 may include determining, by a processor circuit, a monetary transaction at a casino device associated with a first monetary amount (Block 402). The operations may further include determining, by the processor circuit, a user account associated with the monetary transaction (Block 404). The operations may further include displaying, at a display device of the casino device, an offer to purchase a wagering game entry for a second monetary amount less than the first monetary amount (Block 406). The operations may further include, in response to acceptance of the offer, associating, by the processor circuit, the wagering game entry with the user account (Block 408). The operations may further include determining, by the processor circuit, a wagering game result for the wagering game entry (Block 410). The operations may further include, in response to the wagering game result being a winning result, awarding, by the processor circuit, a wagering game award to a user associated with the user account (Block 412).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet or other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any base games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, steps, operations, elements, and/or components, but do not preclude the presence or addition of one or more other features, steps, operations, elements, components, and/or groups thereof. As used herein, the term “and/or” includes any and all combinations of one or more of the associated listed items and may be designated as “/”. Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A gaming system comprising:

a processor circuit; and a memory comprising machine-readable instructions that, when executed by the processor circuit, cause the processor circuit to:

provide, via a first electronic gaming machine (EGM), a base wagering game to a player, wherein the base wagering game is associated with a return to player (RTP) percentage;

determine a monetary transaction at the first EGM associated with a first monetary amount;

determine a user account associated with the monetary transaction and the player;

display, at a display device of the first EGM via a service window overlaid on the base wagering game, an offer to purchase a wagering game entry for a second monetary amount less than the first monetary amount, wherein the wagering game entry corresponds to a secondary wagering game run separately from the RTP percentage of the base wagering game;

in response to acceptance of the offer, associate the wagering game entry with the user account;

determine a wagering game result for the wagering game entry;

determine that, at the time the wagering game result is determined, the player is playing a second EGM different from the first EGM;

in response to the wagering game result being a winning result, display a win notification to the player via a machine interface of the second EGM; and award a wagering game award to the player.

2. The gaming system of claim 1, wherein the second monetary amount is deducted from the first monetary amount.

3. The gaming system of claim 1, wherein the first monetary amount comprises a base game wager for the base wagering game.

4. The gaming system of claim 1, wherein the first monetary amount comprises a cashout amount at the first EGM.

5. The gaming system of claim 1, wherein the first monetary amount comprises a base wagering game award.

6. The gaming system of claim 1, wherein the first monetary amount comprises a purchase amount for a purchase at a point-of-sale device.

7. The gaming system of claim 1, wherein the wagering game entry comprises a game ticket for a wagering game drawing.

8. The gaming system of claim 7, wherein the determination of the wagering game result for the wagering game entry occurs on a predetermined schedule.

9. The gaming system of claim 7, wherein the determination of the wagering game result for the wagering game entry occurs at a randomly selected time.

10. The gaming system of claim 1, wherein the instructions further cause the processor circuit to:

notify the user associated with the winning result of the winning result.

11. The gaming system of claim 10, wherein the notification of the user comprises transmission of a notification message to a mobile computing device associated with the user for display by the mobile computing device.

12. The gaming system of claim 10, wherein the notification of the user comprises display of a notification message by the display device of the first EGM.

13. A gaming system comprising:

a first electronic gaming machine (EGM) comprising a display device and an input device;

a second EGM; and a central controller comprising machine-readable instructions that, when executed by the central controller, cause the central controller to:

provide a base wagering game to a player, wherein the base wagering game is associated with a return to player (RTP) percentage;

determine a monetary transaction at the first EGM associated with a first monetary amount;

determine a user account associated with the monetary transaction;

display, at the display device via a service window overlaid on the base wagering game, an offer to purchase a wagering game entry for a second monetary amount less than the first monetary amount, wherein the wagering game entry corresponds to a secondary wagering game run separately from the RTP percentage of the base wagering game;

in response to acceptance of the offer, associate the wagering game entry with the user account;

determine a wagering game result for the wagering game entry;

determine that, at the time the wagering game result is determined, the player is playing the second EGM;

in response to the wagering game result being a winning result, transmit instructions to display a win notification to the player via a machine interface of the second EGM; and award a wagering game award to the player.

14. The gaming system of claim 13, wherein the second monetary amount is deducted from the first monetary amount.

15. The gaming system of claim 13, wherein the first monetary amount comprises a base game wager for the base wagering game.

16. The gaming system of claim 13, wherein the first monetary amount comprises a cashout amount.

17. The gaming system of claim 13, wherein the first monetary amount comprises a base wagering game award.

18. The gaming system of claim 13, wherein the first monetary amount comprises a purchase amount for a purchase at a point-of-sale device.

19. The gaming system of claim 13, wherein the wagering game entry comprises a game ticket for a wagering game drawing.

20. A gaming method comprising:

providing, via a first electronic gaming machine (EGM), a base wagering game to a player, wherein the base wagering game is associated with a return to player (RTP) percentage;

determining, by a processor circuit, a monetary transaction at first EGM associated with a first monetary amount;

determining, by the processor circuit, a user account associated with the monetary transaction;

displaying, at a display device of the first EGM via a service window overlaid on the base wagering game, an offer to purchase a wagering game entry for a second monetary amount less than the first monetary amount, wherein the wagering game entry corresponds to a secondary wagering game run separately from the RTP percentage of the base wagering game;

in response to acceptance of the offer, associating, by the processor circuit, the wagering game entry with the user account;

determining, by the processor circuit, a wagering game result for the wagering game entry; and determining that, at the time the wagering game result is determined, the player is playing a second EGM different from the first EGM;

in response to the wagering game result being a winning result, displaying a win notification to the player via a machine interface of the second EGM; and awarding, by the processor circuit, a wagering game award to the player.

* * * * *